United States Patent
Reisenauer et al.

[11] Patent Number: 6,161,910
[45] Date of Patent: Dec. 19, 2000

[54] LED READING LIGHT

[75] Inventors: William E. Reisenauer, Commack; Jennifer L. Gloisten, Farmingville; Tolek Pawelko, Deer Park, all of N.Y.

[73] Assignee: Aerospace Lighting Corporation, Holbrook, N.Y.

[21] Appl. No.: 09/460,877

[22] Filed: Dec. 14, 1999

[51] Int. Cl.[7] .................................................. G05F 1/00
[52] U.S. Cl. ..................... 316/309; 315/312; 315/158; 315/224; 362/800; 362/235
[58] Field of Search ................................. 315/309, 312, 315/158, 224, 112; 362/800, 235, 227, 240, 294, 373

[56] References Cited

U.S. PATENT DOCUMENTS

| | | | |
|---|---|---|---|
| 4,947,291 | 8/1990 | McDermott | 362/19 |
| 4,963,798 | 10/1990 | McDermott | 315/312 |
| 5,038,255 | 8/1991 | Nishihashi et al. | 362/61 |
| 5,390,092 | 2/1995 | Lin | 362/235 |
| 5,580,163 | 12/1996 | Johnson, II | 362/285 |
| 5,632,551 | 5/1997 | Roney et al. | 362/249 |
| 5,765,940 | 6/1998 | Levy et al. | 362/240 |
| 5,782,555 | 7/1998 | Hochstein | 362/373 |
| 5,785,418 | 7/1998 | Hochstein | 362/373 |
| 5,857,767 | 1/1999 | Hochstein | 362/294 |
| 6,045,240 | 4/2000 | Hochstein | 362/294 |

*Primary Examiner*—Haissa Philogene
*Attorney, Agent, or Firm*—Collard & Roe, P.C.

[57] ABSTRACT

An LED reading light assembly has an optical assembly, a power circuit board, a housing, and a control system. The optical assembly includes a holographic lens and an LED assembly comprising an LED circuit board and a plurality of LED's disposed on the outward facing side of the LED circuit board. The power circuit board provides a constant source of electric current to power the LED's. The housing includes a housing plate disposed behind the LED circuit board and a black anodized fin plate. The control system includes a temperature protection circuit monitoring the ambient temperature at the LED assembly during operation and adjusting the power supplied to the LED's to maintain the ambient temperature within a selected temperature range.

11 Claims, 4 Drawing Sheets

LED READING LIGHT

BACKGROUND OF THE INVENTION

1. Field of the Invention

The present invention relates to reading lights and more particularly a light emitting diode (LED) reading light assembly suitable for use in aviation applications.

2. The Prior Art

It is known to use white LED's as a light source for illumination purposes. For example, U.S. Pat. No. 4,947,291 to McDermott relates to a device for cockpit lighting including a filter for adjustable proportional dimming of the emitted white light from LED's. U.S. Pat. No. 4,963,798 relates to a white LED illumination device which uses the resistance of an incandescent lamp element as a current limiting resistor to protect the LED from excessive current.

It is also known to use a thermally conductive housing to prevent heat from accumulating in the chamber housing the LED lamp. For example, U.S. Pat. No. 5,038,255 to Nishihashi et al. discloses a vehicle lamp having a housing made of synthetic resin to improve heat conductivity, a lens and a plurality of LED's placed on a long light source fixing face member. The light source fixing face is provided on the inner face of the housing so that heat can be effectively disbursed directly to the atmosphere. Similarly, Roney et al, U.S. Pat. No. 5,632,551 discloses an LED vehicle lamp assembly such as for truck trailers or tractors having LED's mounted to a circuit board inside a housing filled with a resin for conducting excess heat to the outside environment. The housing is preferably formed of anodized aluminum to promote heat transfer and to minimize corrosion. See also U.S. Pat. Nos. 5,782,555; 5,785,418 and 5,857,767 to Hochstein. The Hochstein '555 and '418 patents disclose an LED lamp assembly including a thermally conductive plating to conduct heat from the leads of the LED, and a heat sink for conducting heat to the light emitting side of the assembly. The Hochstein '767 patent discloses an LED lamp assembly including an aluminum heat sink formed to include heat radiating fins which dissipate heat.

U.S. Pat. No. 5,765,940 to Levy et al discloses an LED-illuminated stop/tail light assembly for vehicles which includes a lens that is capable of directing light from the LED's both horizontally and vertically. A current regulating assembly mounted within the housing has a first output that provides either a low current level for tail-light mode or a high current level for brake light mode and a second output that provides a current return path. The current regulating assembly maintains steady current through the LED's independent of the power source voltage so as to prevent an overheating of the LED's at higher than normal voltages and to provide consistent non-flickering light output with varying input voltages. The lens includes hyperbolic surfaces and a prismatic lens. See also U.S. Pat. No. 5,580,163 to Johnson, II, which includes a flexible membrane for focusing an LED light source.

Another patent of general interest is U.S. Pat. No. 5,390,092 to Lin which shows a light emitting device receptacle including a housing and a circuit board in the housing to which the LED's are affixed.

A key advantage of LED technology over more conventional light sources, such as incandescent or halogen lamps, is the much higher anticipated life of the LED source. Long lamp life is particularly advantageous in aviation application where lamp replacement is cumbersome and requires the use of highly skilled and certified workers to effect replacement. Current LED's offer mean time between failure values of approximately 100,000 operating hours compared to 1,000 to 4,000 hours for filament based devices, including incandescent and halogen lamps.

Achieving the predicted longevity of the LED's, however, is predicated upon operating them within their prescribed operating envelopes. For LED's, typical maximum full power operating temperatures are limited to 50 degrees Celsius. Above 50 degrees Celsius, they can be operated although at proportionally reduced power up to approximately 85 degrees Celsius, at which point and above they should be at zero power. Although at the present time there are a large variety of LED assemblies, there is still a need for a highly reliable, long life and low heat dissipation LED reading light assembly that produces the maximum light output over the widest range of ambient temperature conditions.

OBJECTIVES AND FEATURES OF THE INVENTION

It is an objective of the present invention to provide an LED reading light assembly which operates at maximum power to maximize light output over a wide range of ambient temperature conditions, so that it may be used, for example, in aircraft environments for reading light applications.

It is a further objective of the present invention to provide such an LED reading light assembly which addresses each element of thermal management including effective heat transfer, dissipation, and control of internal heat production.

It is a further feature of the present invention to provide an LED reading light assembly which exhibits superior light and life performance characteristics.

SUMMARY OF THE INVENTION

An LED reading light assembly is provided for use, for example, in airborne applications where maintenance costs associated with lamp replacement and the power penalties in light production and cooling make high reliability, long life and low heat dissipation particularly valuable. The LED reading light assembly has an optical assembly, a power circuit board, a housing, and a control system.

The optical assembly has a holographic lens, an optical cavity and an LED assembly. The LED assembly includes an LED circuit board having an outward facing side preferably coated with a reflective white solder mask, and a plurality of LED's, for example fifty (50), disposed on the outward facing side. Preferably, the LED's during operation emit light having a color rendering index of 85 and a color temperature of 5100 degrees Kelvin.

The power circuit board, which is preferably part of a power assembly, is adapted to supply a constant source of electric current to power the LED's. Preferably, a 28 VDC electrical system is electrically connected to the LED reading light assembly.

The housing preferably is constructed of aluminum and has a housing plate disposed behind the LED circuit board and a highly textured, black anodized fin plate. Preferably a cylinder mounted to the LED assembly forms an optical cavity.

The control system includes a temperature protection circuit monitoring the ambient temperature at the LED assembly and adjusting the power supplied to the LED's to maintain the ambient temperature within a selected temperature range based on their prescribed operating envelope.

Preferably, the temperature protection circuit reduces the power to the LED's when the ambient temperature rises above a selected value. The temperature protection circuit preferably includes a plurality of chains of multiple diodes, for example, six-chains of six diodes, with each of the chains driven by a constant source of electric current.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
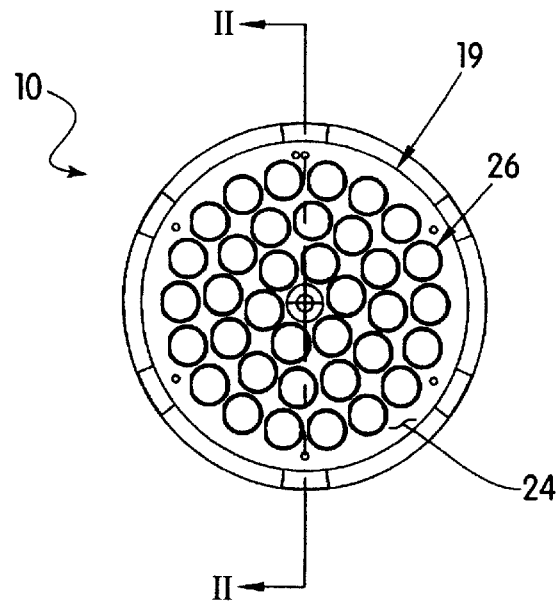
FIG. 1 is a front view of an embodiment of the present invention.
Figure 2:
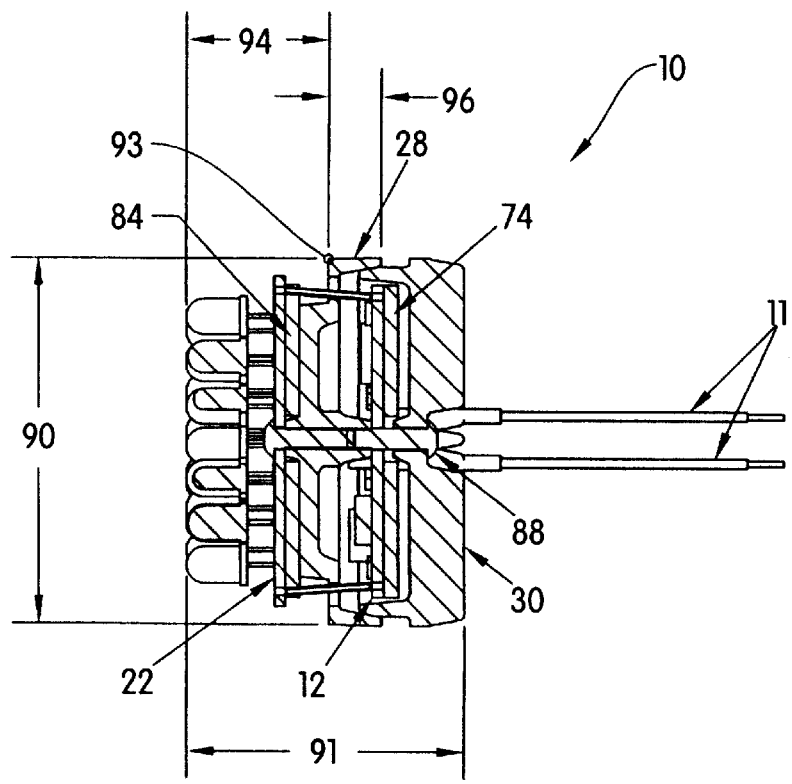
FIG. 2 is a side cross-sectional view taken along section line A—A of FIG.1
Figure 3:
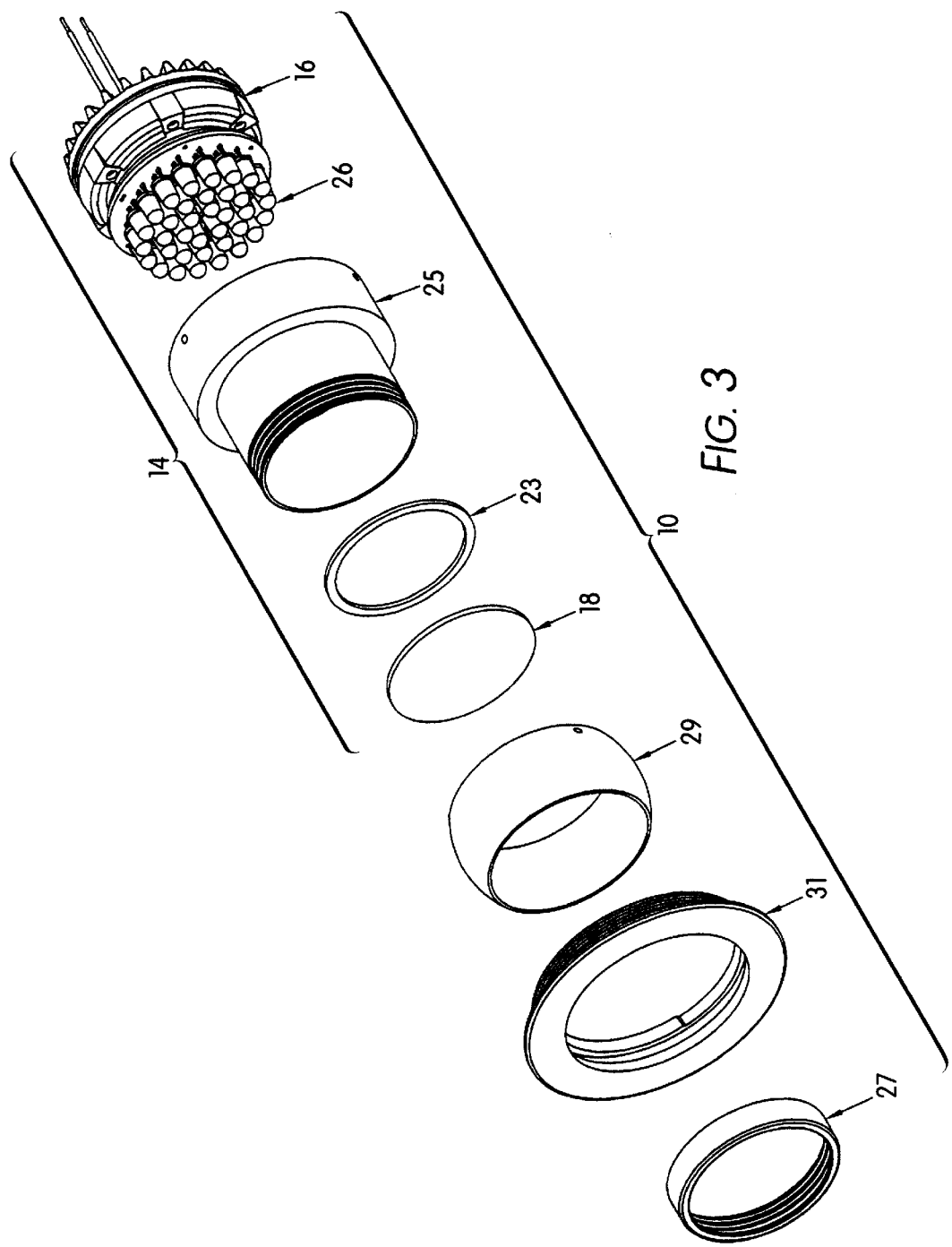
FIG. 3 is an exploded perspective view of the embodiment shown in FIG.1 and FIG.2.

The LED reading light assembly 10 of a preferred embodiment is shown in FIGS. 1–4 and comprises a power assembly including a power circuit board 12, an optical assembly 14 and a housing 16. Optical assembly 14 includes a holographic lens 18 and an LED assembly 20. LED assembly 20 includes an LED circuit board 22 having an outward facing side 24 and a plurality of LED's 26 disposed on outward facing side 24, which preferably emit white light during operation. Preferably, LED circuit board 22 is circular with a diameter of curvature 19 of 1.900 inches, for example, with 36, 50, or 54 LED's disposed on outward facing side 24. As shown in FIG. 3, an optical cavity is formed at the front of LED assembly 20 by an external cylinder 25 preferably mounted to housing 16. Retaining ring 27 secures holographic lens 18 to cylinder 25 firmly by washer 23.

Preferably, a ball 29 is movably disposed on external cylinder 25 for directing the light emitted by LED's 26. In addition, a flange 31 may be assembled to ball 29 for mounting within the aircraft. Use of holographic lens 18 enables the reading light to integrate the light produced by the individual LED's 26 into an even and continuous light pattern. Light energy is directed by lens 18 into a desired geometric region so that the maximum light energy is delivered to the work surface. Preferably, a 10 degree holographic lens is used having a thickness of 0.062 inches, for example. The optical cavity formed by external cylinder 25 provides the focal range for holographic lens 18. Preferably, a reflective white solder mask coating is applied to outward facing side 24 of LED circuit board 22, which contributes to the performance of the optical cavity.

As will be appreciated by those skilled in the art, by selection of appropriate LED components, with the assembly of the present invention, light quality, notably the high Color Rendering Index (CRI) of 85 and the desirable color temperature of 5100 degrees Kelvin, can be achieved, which is unparalleled in other LED applications.

Housing 16 provides mechanical protection and structural support for the LED, power, and optical assemblies. Preferably, housing 16 is constructed of aluminum and designed to ensure that LED reading light assembly 10 will withstand the full range of shock, vibration, temperature, and humidity as required for airborne applications.

Figure 4:
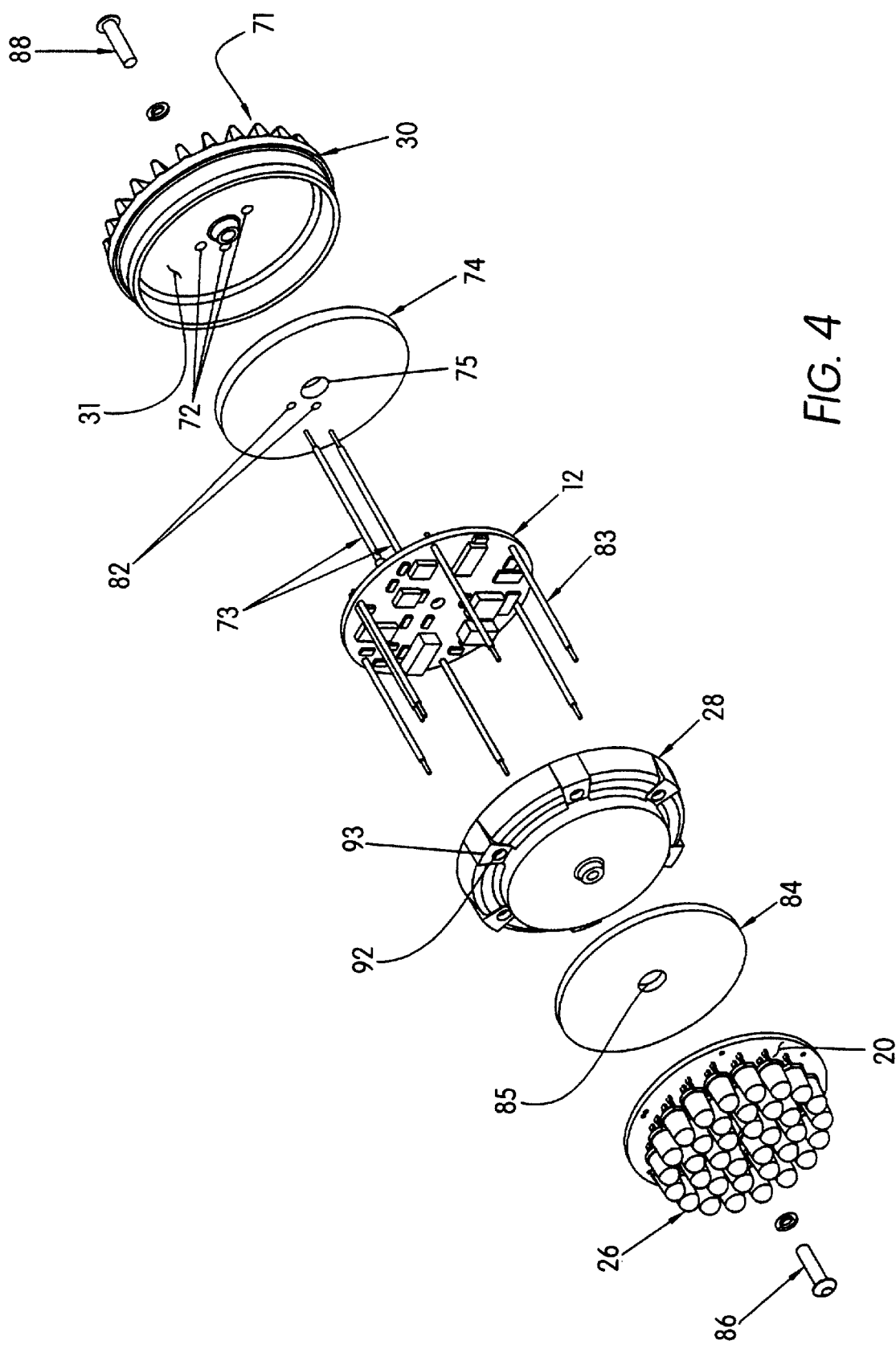
FIG. 4 is an exploded perspective view of the housing and LED assembly of FIG. 3.

As shown in FIG. 4, housing 16 comprises a front heat sink comprising a housing plate 28, preferably circular, disposed behind LED assembly 20 and a back heat sink comprising a black anodized fin plate 30 which may be highly textured.

Fin plate 30 has a circular recess 31 on one side and a radially finned surface 71 on the other side. A plurality of wire receiving apertures 72 extend through fin plate 30 for receipt of wires 73 extending from power circuit board 12 and electrically connected to a power source.

A soft, circular, thermally conductive pad 74 is received within recess 31 of fin plate 30. Thermal pad 74 also has a plurality of wire receiving apertures 82 aligned with apertures 72 of fin plate 30 and extending through thermal pad 74.

Power printed circuit board 12 is disposed on the side of thermal pad 74 opposite to fin plate 30. A plurality of wires 73 extends from one side of power circuit board 12 and are received by wire receiving apertures 82, 72 of thermal pad 74 and fin plate 30.

Front circular heat sink 28 is mounted to power printed circuit board 12 and has a plurality of wire receiving apertures 92 along its circumference 93 for receipt of a plurality of wires 83 extending from the side of LED circuit board 22 opposite to the side having LED's 26 disposed thereon. A front thermal pad 84 is mounted to one side of front heat sink 28 between LED circuit board 22 and front heat sink 28.

A plurality of fasteners 86, 88, for example, screws and washers, mount the various components together. Fastener 86 mounts LED circuit board 22 and front thermal pad 84 to one side of front heat sink 28 through opening 85 of front thermal pad 84. Fastener 88 mounts back heat sink 30, back thermal pad 74, and power printed circuit board 12 to the other side of front heat sink 28 through opening 75 in back thermal pad 74.

LED reading light assembly 10 is preferably formed compact in size. Referring to FIG. 2, assembly 10 has an overall height 90 and an overall length 91 from the front of LED's 26 to the end of fin plate 30, which are 2.00 inches and 1.550 inches respectively, for example. The distance 94 between the front of LED's 26 to circumference 93 of housing plate 28 is 0.800 inches, for example, and the distance 96 from circumference 93 to the end of housing plate 28 is 0.290 inches, for example.

Heat generated by LED assembly 20 is transferred via conduction to housing plate 28. From there, it flows radially outward to external cylinder 25 and then rearward. The black anodized fin plate 30 facilitates radiant heat transfer from the back of assembly 10, cooling both the LED and power assemblies. In contrast, conventional incandescent or halogen designs produce significantly greater heat energy and require large orifices and circulating air for adequate cooling.

The power assembly contains the bulk of the electronic intelligence for the device. A constant current source powers the LED's, enabling the reading light to provide a steady optimum light output over large fluctuations of input voltage, and also illuminates the individual LED's.

Figure 5:
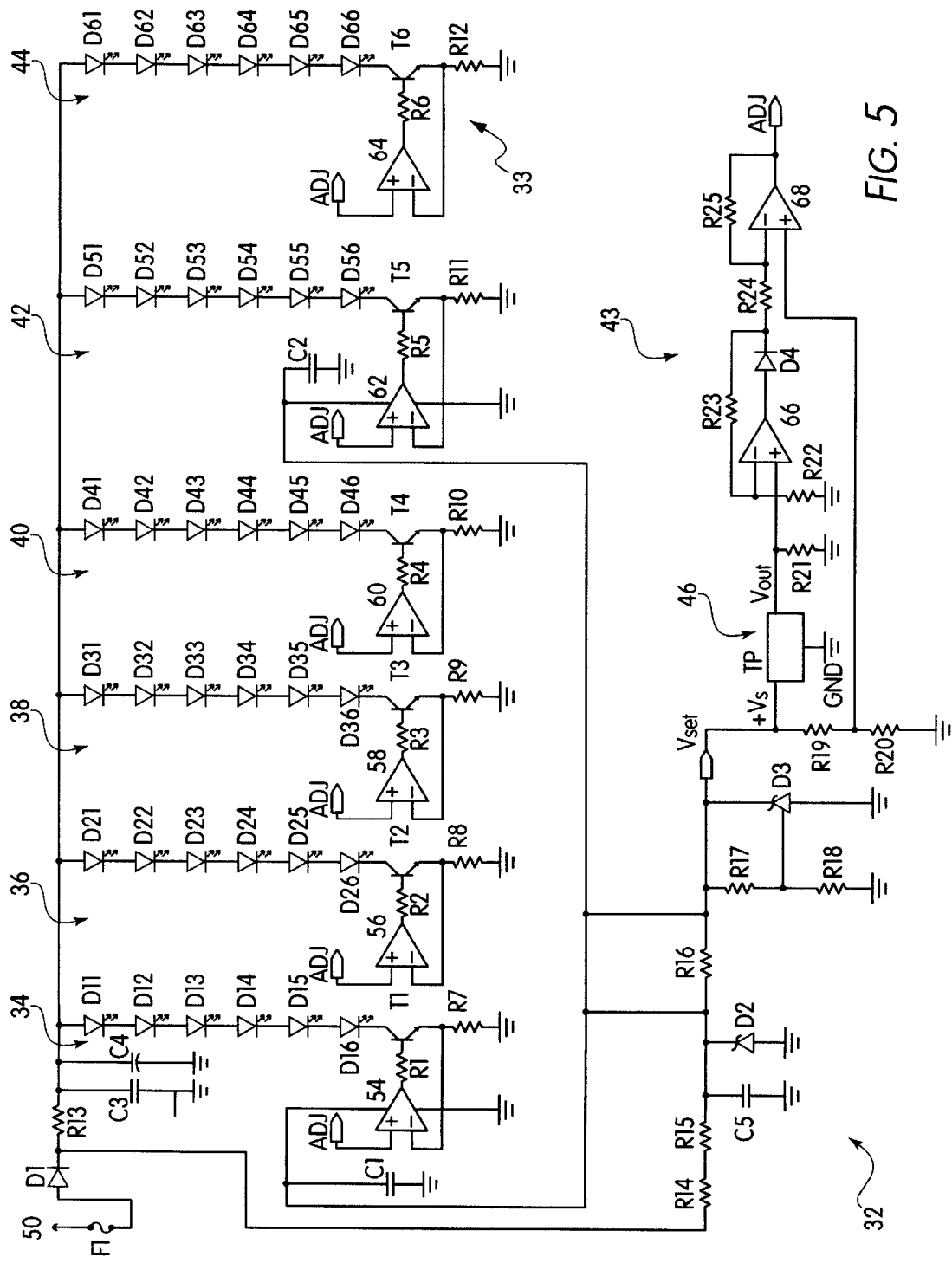
FIG. 5 is a circuit diagram of a temperature protection circuit incorporated in the LED reading light assembly of the present invention.

LED reading light assembly includes a control system comprising a temperature protection circuit 32 shown in FIG. 5 to promote LED longevity in adverse heat environments. Temperature protection circuit 32 continuously monitors the ambient temperature at LED assembly 20 and reduces the power to LED's 26 when their temperature rises above a selected value, for example, the rated continuous values of the LED's.

As shown in FIG. 5, temperature protection circuit 32 comprises an electrical driving circuit 33, a temperature compensating circuit 43, and a temperature sensing device 46. Driving circuit 33 is electrically connected to a power supply 50 through fuse F1, diode D1 and resistor R13. Temperature compensation circuit 43 and temperature sensing device 46 are provided with a stable voltage reference through diode D3 and resistors R16, R17 and R18. Temperature protection circuit 43 also includes diode D2, resistors R14 and R15, and other devices whose function is to protect the circuit from abnormal aircraft power surges.

Driving circuit 33 includes 36 diodes (LED's), D11–D16, D21–D26, D31–D36, D41–D46, D51–D56, and D61–D66 in six chains 34, 36, 38, 40, 42, and 44 of six diodes each. Each six diode chains 34, 36, 38, 40, 42 and 44 connects to the collector of a respective transistor T1–T6. Under normal operating conditions, electrical circuit 33 drives the diodes with a constant current source established in the transistor's emitter circuit via the respective transistor's fixed emitter resistor R7–R12 and a signal generated by temperature compensation circuit 43. An operational amplifier 54, 56, 58, 60, 62, 64 drives the base of each transistor T1–T6 and maintains a fixed voltage across each emitter resistor R7–R12 that is proportional to the temperature compensation signal. This controlled voltage in the emitter circuit produces the controlled current in the collector circuit of transistors T1–T6.

Temperature compensation circuit 43 includes operational amplifiers 66 and 68 and diode D4. Temperature sensing device 46, such as an Analog Devices part number TMP37, converts temperature data between 5 degrees Celsius and 100 degrees Celsius to a proportional electrical voltage. Temperature compensation circuit 43 reverse biases diode D4 for voltages of temperature sensing device 46 less than the equivalent of 50 degrees Celsius. With D4 reverse biased, temperature compensation circuit 43 produces a constant output voltage at the output of operational amplifier 68 based solely upon a precise voltage reference D3.

For temperatures about 50 degrees Celsius, diode D4 becomes forward biased. As temperatures, and therefore equivalent voltages increase, the output of operational amplifier 66 continues to increase, consequently driving the output of operational amplifier 68 proportionally lower. The closed loop system continuously monitors the diode temperature and adjusts the operating power until an equilibrium is reached. As temperatures approach 85 degrees Celsius, the diode power approaches zero.

In this way, LED reading light assembly 10 continuously monitors the operating temperature of the LED's and adjusts the input power to maintain maximum illumination over all ambient temperature conditions. Temperature compensation circuit 43 emulates the complex, piecewise linear transfer characteristics of the LED's. Below 50 degrees Celsius, the LED's operate at full continuous power yielding maximum light output. Given the efficient thermal dissipation characteristics of the design, LED reading light assembly 10 will produce maximum illumination for most operating ambient conditions. Under unusual high temperature situations, the circuit will adjust the power provided to the LED's to the diodes from excess heat.

Reading light assembly 10 preferably operates from standard 28 VDC electrical systems preferably through electrical contacts 11, such as a plurality of wires, preferably two, extending to a two-pin connector. Operation is similar in most aspects to conventional style lamps. Assembly 10 is preferably designed such that it may be installed in a variety of decorative fixtures without regard to the thermal properties of the fixture.

While preferred embodiments of the present invention have been shown and described, it is to be understood that many changes and modifications may be made hereunto. Without departing from the spirit and scope of the invention as defined in the appended claims.

What is claimed is:

1. An LED reading light assembly comprising:
   (a) An optical assembly comprising:
      (i) a holographic lens:
      (ii) an LED assembly comprising an LED circuit board having an outward facing side and a plurality of LED's disposed on the outward facing side, said LED assembly having an ambient temperature during operation
   (b) a power circuit board adapted to supply a constant source of electric current to power the LED's;
   (c) a housing comprising
      (i) a housing plate disposed behind the LED circuit board;
      (ii) a black anodized fin plate; and
   (d) a control system comprising a temperature protection circuit monitoring the ambient temperature at the LED assembly and adjusting the power supplied to the LED's to maintain the ambient temperature within a selected temperature range.

2. An LED reading light assembly according to claim 1 further comprising an optical cavity formed by a cylinder mounted to the LED assembly.

3. An LED reading light assembly according to claim 1 wherein the temperature protection circuit reduces the power to the LED's when the ambient temperature rises above a selected value.

4. An LED reading light assembly according to claim 1 wherein a reflective white solder mask coating is applied to the outward facing side of the LED circuit board.

5. An LED reading light assembly according to claim 1 wherein the temperature protection circuit comprises a temperature sensing device and a plurality of chains of a plurality of LED's, each of said chains providing a constant source of electric current.

6. An LED reading light assembly according to claim 1 wherein the temperature protection circuit comprises a temperature sensing device and six chains of six LED's, each of said chains providing a constant current source.

7. An LED reading light assembly according to claim 1 comprising:
   (a) a back heat sink comprising a black anodized fin plate having a circular recess on one side and a radially finned surface on the other side, said fin plate having a plurality of wire receiving apertures extending therethrough;
   (b) a soft, circular thermal pad received within the recess of the fin plate, said pad having a plurality of wire-receiving apertures extending through said pad and aligned with the wire-receiving apertures of said fin plate;

(c) a power printed circuit board having a plurality of wires extending from one side of said board and received by the wire-receiving apertures of said thermal pad and said fin plate;

(d) a front circular heat sink mounted to said power printed circuit board, said front heat sink having a plurality of wire-receiving apertures along its circumference;

(e) a front thermal pad mounted to the front heat sink;

(f) an LED circuit board having a plurality of wire's extending from one side of said LED circuit board and received by the wire-receiving apertures of said front heat sink;

(g) a plurality of LED's disposed on the other side of said LED circuit board;

(h) a plurality of fasteners for mounting said back heat sink, said back thermal pad and said power printed circuit board to one side of said front heat sink and for mounting said LED circuit board and front thermal pad to the other side of said front heat sink;

(i) a cylinder mounted to the front heat sink and surrounding the plurality of LED's;

(j) a ball movably disposed on the cylinder for directing the light emitted by the LED's;

(k) a flange mounted to the ball;

(l) a holographic lens mounted within the cylinder; and (m) a retaining ring mounting the holographic lens within the cylinder.

8. An LED reading light assembly according to claim 1 wherein fifty LED's are disposed on the LED circuit board.

9. An LED reading light assembly according to claim 1 wherein the housing is constructed of aluminum.

10. An LED reading light assembly according to claim 1, wherein the LED's during operation emit light having a color rendering index of 85 and a color temperature of 5100 degrees Kelvin.

11. An LED reading light assembly according to claim 1 wherein the assembly is electrically connected to a 28 VDC electrical system.

\* \* \* \* \*